Sept. 25, 1962  H. P. KOPPEHELE  3,055,048
SIMULTANEOUS BIAXIAL STRETCHING OF FILM WITH A TENTER FRAME
Filed Nov. 12, 1959

United States Patent Office 3,055,048
Patented Sept. 25, 1962

3,055,048
SIMULTANEOUS BIAXIAL STRETCHING OF FILM WITH A TENTER FRAME
Hugo Paul Koppehele, Glen Riddle, Pa., assignor to American Viscose Corporation, Philadelphia, Pa., a corporation of Delaware
Filed Nov. 12, 1959, Ser. No. 852,578
16 Claims. (Cl. 18—1)

The present invention relates to the manufacture of plastic films or sheets, and particularly to an apparatus for biaxially stretching of crystalline polymeric materials to improve the properties thereof.

In the conventional manufacture of films of polymeric materials, as for example from polyethylene or polypropylene polymers, the molten polymer is extruded as a continuous sheet and is then rapidly quenched, as for example, by a cooling liquid or gas. The film thus formed is then stretched or drawn in both longitudinal and transverse directions, while in a heated condition, to effect an orientation of the polymer molecules and thereby enhance both the physical and optical properties of the film.

To insure uniform molecular orientation in all directions, and to simplify the stretching operation itself, the film is preferably stretched simultaneously in both longitudinal and transverse directions. The known procedures and apparatus for accomplishing this function, however, have not proven to be entirely satisfactory. For example, in one of the most simplest and perhaps one of the most efficient of the known stretching procedures, thickened or beaded longitudinal edges of a film are slidably engaged with stationary metal tracks disposed along divergent planes. The film is drawn relative to the stationary tracks at a rate of speed which is greater than the rate of film delivery so that the film is drawn longitudinally simultaneously with its transverse stretching by the divergent tracks.

In this known system, the friction arising from the film beaded edges sliding over the stationary tracks introduces a number of problems relating to both the actual stretching operation and the properties which are imparted to the film. The sliding friction between the polymeric material and the metal track surfaces has been found to continuously vary throughout the stretching operation and is dependent upon a number of variables, ranging from the velocity and the original temperature of the beaded edges of the film to the frequency of viscoelastic response (shearing effects) due to frictional heating. The manner in which energy dissipation occurs between the output and input areas of the stretching apparatus is such that the frictional effects are brought into play in a somewhat complex manner, thus precluding the use of such known stretching devices in high speed commercial film stretching operations. Accordingly, a primary object of this invention is to provide a new or improved and more satisfactory apparatus for simultaneously stretching a continuous traveling film along biaxial directions.

Another object of the invention is to provide an improved apparatus for effecting a simultaneous biaxial stretching of a continuous beaded edge film to impart uniform physical and optical properties thereto along all directions.

A further object of the invention is to provide an improved high speed film stretching apparatus wherein the longitudinal edges of a continuous beaded edge film are slidably supported and advanced along divergent paths, while the film itself is tensioned or stretched in a longitudinal direction.

These and other objects, features, and advantages will become apparent from the following description of the invention and the drawing relating thereto in which.

In general, the apparatus of the present invention includes a pair of laterally spaced driven endless conveyors which are disposed between pairs of feed and draw rolls and extend along divergent paths. The endless conveyors are each provided with a series of clips having cooperating gripping elements which engage with and transport the longitudinal edges of a beaded edge film as the conveyors are advanced, yet permit the film to slide relative to the conveyors when the film is longitudinally tensioned. As the conveyors carry the film away from the feed rolls and toward the draw rolls, the reaches of the conveyors which are engaged with the beaded edges of the film travel along diverging paths and thus the film is gradually stretched in a transverse direction. The draw rolls are operated at a rate of speed greater than that of the conveyors to thereby exert a positive longitudinal pull or tension on the film. Thus, concomitantly with the transport and transverse stretching of the film by the endless conveyors, the positive pull applied by the draw rolls serves to gradually stretch the film in a longitudinal direction, with the film itself sliding longitudinally relative to the conveyor clips. Since the film web and beads decrease in size as the stretching operation progresses, the cooperating gripping elements of the individual conveyor clips are gradually and sequentially urged toward each other to maintain a generally uniform engagement with the film beads throughout the stretching procedure.

Figure 1:
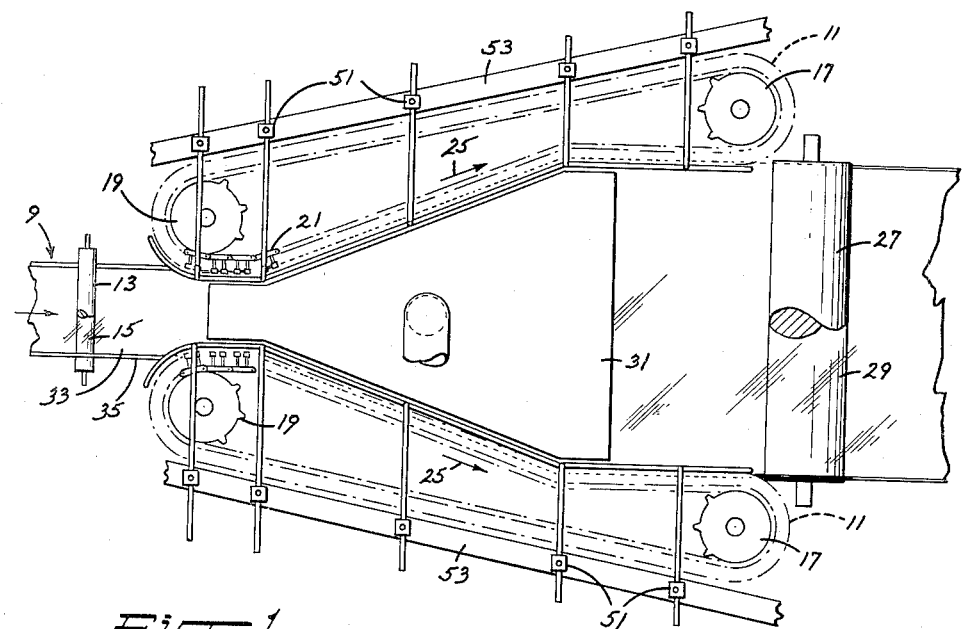
FIGURE 1 is a plan view of the film stretching apparatus of the present invention, with portions thereof being shown in detail.

With reference to the drawing for a more detailed description of the invention, the film to be stretched, indicated by the character 9, is delivered to a pair of laterally spaced endless conveyors 11 by a pair of feed rolls 13 and 15, which are driven by a suitable means not shown. The conveyors 11 are trained around sprockets 17 and 19 and are each formed of a series of film engaging clips 21 which are pivotally interconnected by pins 23 into a flexible endless arrangement. At least one of each pair of sprockets is driven by conventional means, not shown, to advance the endless conveyors along directions as indicated by the arrows 25 with track means, not shown, being provided for guiding the adjacent opposing reaches of the conveyors 11 along desired divergent paths as illustrated in FIGURE 1.

The endless conveyors 11 slidably engage with the longitudinal edges of the film 9 as it leaves the feed rolls 13 and 15 and carry the same along the desired divergent paths to thus stretch the film in a transverse direction. A pair of draw or take-up rolls 27 and 29 are disposed adjacent to the sprockets 17 for stretching the film in a longitudinal direction simultaneously with the transverse stretching thereof, as hereafter described. To maintain the film at a desired elevated temperature during the stretching operation, a fan-shaped heater 31 is disposed between the conveyors 11 along one or both sides of the film path of travel.

Figure 2:
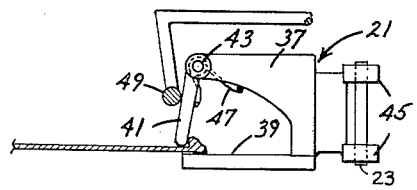
FIGURE 2 is a side view of a film engaging clip employed in the apparatus illustrated in FIGURE 1, with the clip elements being shown in positions assumed at the start of the film stretching operation.
Figure 3:
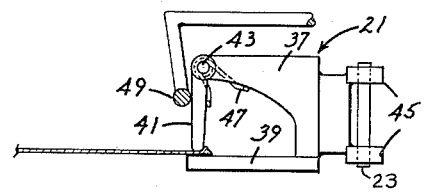
FIGURE 3 is a view similar to FIGURE 2 illustrating the relative positions of the clip elements at the end of the stretching operation.

The film 9 is formed of suitable crystalline polymeric materials such as polyethylene or polypropylene and is of conventional configuration, having a web 33 and thickened or beaded longitudinal edges 35. As heretofore mentioned, the film 9 is slidably engaged with the conveyors 11 by means of clips 21, each of which includes a main body 37, a film support plate 39, latches 41 swingably supported on pins 43, and ears 45 which facilitate the interconnection of adjacent clips by the pivot pins 23. As shown in FIGURES 2 and 3, springs 47 are provided for urging the latches 41 into engagement with cam rods or tracks 49 which extend along the diverging paths of the conveyors 11, as shown in FIGURE 1. The cam rods 49 are adjustably mounted at 51 to suitable fixed structures 53 and serve to maintain the free ends of the clip latches 41 spaced from their respective support plates 39 a distance which is not less than the thickness of the film web 33, as more fully described hereafter.

In lacing the apparatus for stretching operations, the film 9 is initially passed between the feed rolls 13 and 15 and is then engaged along its beaded edges 35 with the conveyor clip 21 as they move around the sprockets 19. The clip latches 41 are normally maintained spaced from their respective support plates 39 by the springs 47 but are gradually urged downwardly by the cam rods 49 as the conveyors move around the sprockets 19 and into film engaging position. Thus, as the film 9 enters inbetween the cooperating conveyors 11, the beaded edges thereof are engaged or gripped between the support plates 39 and latches 41 of opposing conveyor clips 21, as shown in FIGURE 2, with the free ends of the latches 41 being spaced from their respective support plates 39 a distance at least equal to the thickness of the film web 33 but less than the thickness of the film beads 35. The conveyors 11 are then advanced to carry the leading end of the film 9 toward and between the draw rolls 27 and 29 to thus complete the film lacing procedure.

With the apparatus laced as described above, the heater 31 is set into operation and the conveyors 11 and feed rolls 13 and 15 are then advanced at substantially the same rate of speed to carry the film beads 35 along the diverging paths and thereby stretch the film web 33 in a transverse direction. The draw rolls 27 and 29, however, are rotated at a rate of speed greater than that of the conveyors 11 so as to exert a positive pull or tension on the film in a longitudinal direction. In view of the spacing between the support plates 39 and the free ends of the latches 41, as heretofore described, only a limited frictional contact is present between the conveyor clips 21 and the beaded edges of the film. Thus, as a tension is exerted on the film by the draw rolls 27 and 29, the film responds by stretching in a longitudinal direction, with the film beads 35 sliding freely relative to the conveyor clips 21. It will be noted that during the stretching operation the film 9 is actually carried along the desired path by the conveyors 11 and that the longitudinal force exerted by the draw rolls 27 and 29 need be only of sufficient magnitude as to overcome the limited frictional contact between the beaded edges of the film and the conveyor clips, and to effect the desired elongation of the film. Thus, while the rate of speed of the conveyors and draw rolls 27 and 29 will vary with such factors as the film thickness, the length of the stretching device, and the degree of film elongation desired, the relative speed between these elements will be such that the rates of longitudinal and transverse stretching of the film are substantially the same.

During the film stretching procedure, it will of course be apparent that the film web 33 and beads 35 will both be gradually and progressively reduced in thickness. With the apparatus of the present invention, however, the frictional engagement between the film beaded edges 35 and conveyor clips 21 is maintained substantially uniform throughout the film stretching procedure by means of the cam rods 49 which serve to gradually and progressively urge the latches 41 toward their respective support plates 39, from a position as shown in FIGURE 2 to one as shown in FIGURE 3, as the conveyors 11 are advanced. The stretched film 9 may be chilled as it is released by the conveyors 11 and passes between the draw rolls 27 and 29, after which it is collected by suitable means, not shown.

Figure 5:
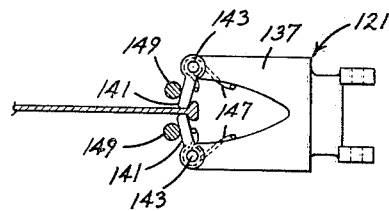
FIGURE 5 is also a view similar to FIGURE 2 showing a modified clip arrangement.
Figure 4:
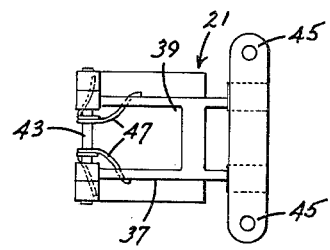
FIGURE 4 is a plan view of the clips shown in FIGURE 2.

The modified clip arrangement 121 illustrated in FIGURE 5 of the drawing operates in substantially the same manner as the clips 21 described above and includes a main body 137, pairs of opposing film gripping latches 141 which are swingably supported on pins 143, and springs 147 which urge the latches 141 into snug engagement with a pair of cam tracks or rods 149. As with the structure described above, the springs 147 and cam rods 149 cooperate to initially position and continuously maintain the free ends of opposing latches 141 spaced from each other a distance not less than the thickness of the film web throughout the film stretching operation. It will be noted that with the modified clip 121 a relatively wide spacing may be maintained between the free ends of the latches 141 thus providing an unobstructed opening for the film as it initially enters in-between the endless conveyors. Further, it will be apparent that only one of the latches 141 need be moved to maintain the uniform frictional contact between the free ends of the latches and the film beaded edges and thus one rod or each pair of rods 149 need be positioned for camming action.

In comparing the above described apparatus with conventional fixed-track stretchng devices, it will be noted that the use of moving conveyors minimizes the frictional effects and enables the applied longitudinal pull or stretching force to act substantially uniformly across the entire width of the film. Further, in view of the close longitudinal spacing of the film engaging clips and the fact that the film itself is slidingly advanced relative to the clips during longitudinal stretching, the tendency for the film edges to assume scalloped formations is completely eliminated. The apparatus here described is highly suited for in-line operation with a film extruder and offers excellent control over the actual stretching operation so that uniform and consistent results are insured.

While preferred embodiments of the invention have been shown and described, it is to be understood that changes and variations may be made without departing from the spirit and scope of the invention as defined in the appended claims.

I claim:

1. An apparatus for stretching a film having a web and beaded longitudinal edges including a pair of laterally spaced endless conveyors for slidably engaging with the beaded edges of the film, means for advancing said conveyors at substantially the same rate of speed, a pair of draw rolls positioned adjacent to the outlet end of said conveyors, and means for driving said draw rolls at a rate of speed greater than that of said conveyors whereby the film is slidably advanced relative to said conveyors and stretched in a longitudinal direction while being restrained transversely by said endless conveyors.

2. An apparatus as defined in claim 1 wherein said endless conveyors each include a series of clips having gripping elements which engage with the beaded edges of the film while being maintained spaced from the film web.

3. An apparatus for stretching a film having a web and beaded longitudinal edges including a pair of laterally spaced endless conveyors for slidably engaging with the beaded edges of the film, means for advancing said conveyors at substantially the same rate of speed, said conveyors being disposed in divergent relationship to effect a transverse stretching of the film as it is advanced by said conveyors, a pair of draw rolls positioned adjacent to the diverging ends of said conveyors, and means for driving said draw rolls at a rate of speed greater than that of said conveyors whereby the film is slidably advanced relative to said conveyors and stretched in a longitudinal direction simultaneously with the transverse stretching thereof.

4. An apparatus as defined in claim 3 wherein said endless conveyors each include a series of opposing gripping elements disposed along opposite surfaces of the film, said opposed gripping elements being spaced from each other to engage with the beaded edges of the film without contacting the film web, and further including means for moving at least one of said gripping elements toward the other of said gripping elements to gradually reduce the spacing therebetween as the film web and beaded edges thereof decrease in size during stretching.

5. An apparatus as defined in claim 3 wherein said endless conveyors each include a series of clips, said clips each including a support plate and a pivoted latch disposed along opposite surfaces of the film and engaging with the beaded edge thereof, and further including means for engaging with the latches of said series of clips for gradually urging the same toward their respective support plates to gradually reduce the spacing therebetween as the film web and beaded edges thereof decrease size during stretching.

6. An apparatus as defined in claim 5 wherein said last-mentioned means includes a stationary cam positioned along the path of each of said conveyors for gradually and sequentially urging the pivoted latches of said series of clips toward the respective support plates.

7. An apparatus as defined in claim 3 wherein said endless conveyors include a series of clips, each of said clips including a pair of cooperating pivoted latches disposed along opposite surfaces of the film and engaging with the beaded edge thereof, and further including means for engaging with and gradually moving at least one latch of each of said clips to reduce the spacing between cooperating latches.

8. An apparatus as defined in claim 7 wherein said last-mentioned means includes a stationary cam positioned along the path of each of said conveyors for gradually and sequentially moving only one latch of each of said series of clips toward an opposing cooperating latch to reduce the spacing therebetween.

9. An apparatus as defined in claim 7 wherein said last-mentioned means includes stationary cams positioned along the path of each of said conveyors for gradually and sequentially urging both latches of each of said clips toward each other.

10. An apparatus for stretching a film having a web and beaded longitudinal edges including a pair of laterally spaced conveyors disposed in diverging relationship, a pair of driven feed rolls for delivering the film between said conveyors, means for driving said conveyors at a rate of speed at least equal to that of said feed rolls, a series of clips carried by each of said conveyors, each of said clips including a support plate and a pivoted latch for slidably gripping opposite sides of a beaded edge of the film, means for maintaining the free ends of said latches engaged with the beaded edge of the film and spaced from said respective support plates a distance at least equal to the thickness of the web of the film being stretched, a pair of draw rolls disposed adjacent to the diverging ends of said conveyors, and means for driving said draw rolls at a rate of speed greater than that of said conveyors whereby the film is slidably advanced relative to said series of clips and is simultaneously stretched in transverse and longitudinal directions.

11. An apparatus as defined in claim 10 wherein said clips include resilient means for urging said latches away from their respective support plates and wherein said means for maintaining the free ends of said latches engaged with the beaded edges of the film include stationary members disposed along the paths of said conveyors for engaging with said latches and urging them toward their respective support plates against the action of said resilient means.

12. An apparatus as defined in claim 11 wherein said stationary members are elongated cams for gradually and sequentially urging the free ends of said latches toward the respective support plates as said conveyors are advanced to thereby reduce the spacing between the free ends of said latches and the respective support plates as the film web and beaded edges decrease in size during stretching, and further including means for heating the film during stretching thereof.

13. An apparatus for stretching a film having a web and beaded longitudinal edges including a pair of laterally spaced conveyors disposed in diverging relationship, a pair of driven feed rolls for delivering the film between said conveyors, means for driving said conveyors at a rate of speed at least equal to that of said feed rolls, a series of clips carried by each of said conveyors, each of said clips including a pair of pivoted latches for slidably gripping a beaded edge of the film between the free ends thereof, means for maintaining the free ends of each pair of latches engaged with the beaded edge of the film and spaced from each other a distance at least equal to the thickness of the film being stretched, a pair of draw rolls disposed adjacent to the diverging ends of said conveyors, and means for driving said draw rolls at a rate of speed greater than that of said conveyors whereby the film is slidably advanced relative to said series of clips and is simultaneously stretched in transverse and longitudinal directions.

14. An apparatus as defined in claim 13 wherein said clips include resilient means for urging said latches away from each other and wherein said means for maintaining the free ends of said latches engaged with the beaded edges of the film include pairs of stationary members disposed adjacent to said conveyors, with the stationary members of each pair being disposed along opposite sides of the path of the film for engaging with said latches and urging the same toward each other against the action of said resilient means.

15. An apparatus as defined in claim 14 wherein at least one stationary member of each pair of stationary members is an elongated cam for gradually and sequentially urging the free ends of said latches engaging therewith toward the free ends of opposing latches as said conveyors are advanced to reduce the spacing therebetween as the film web and beaded edges decrease in size during stretching, and further including means for heating the film during stretching thereof.

16. An apparatus as defined in claim 15 wherein both pairs of stationary members are elongated cams for urging the free ends of cooperating latches toward each other as said conveyors are advanced.

References Cited in the file of this patent

UNITED STATES PATENTS

| | | |
|---|---|---|
| 2,079,584 | Hazell et al. | May 4, 1937 |
| 2,473,404 | Young | June 14, 1949 |
| 2,698,967 | Reichel et al. | Jan. 11, 1955 |
| 2,728,941 | Alles et al. | Jan. 3, 1956 |
| 2,755,533 | Miller | July 24, 1956 |
| 2,866,231 | Vaughan | Dec. 30, 1958 |
| 2,896,262 | Herrmann | July 28, 1959 |
| 2,923,966 | Tooke et al. | Feb. 9, 1960 |